United States Patent
Sekhar et al.

(10) Patent No.: US 6,194,096 B1
(45) Date of Patent: *Feb. 27, 2001

(54) CARBON BODIES RESISTANT TO DETERIORATION BY OXIDIZING GASES

(75) Inventors: Jainagesh A. Sekhar, Cincinnati, OH (US); Vittorio de Nora, Nassau (BS); Jean-Jacques Duruz, Geneva (CH)

(73) Assignee: Moltech Invent S.A (LU)

(*) Notice: Subject to any disclaimer, the term of this patent is extended or adjusted under 35 U.S.C. 154(b) by 0 days.

This patent is subject to a terminal disclaimer.

(21) Appl. No.: 09/101,349

(22) PCT Filed: Jan. 10, 1997

(86) PCT No.: PCT/US97/00304

§ 371 Date: Nov. 25, 1998

§ 102(e) Date: Nov. 25, 1998

(87) PCT Pub. No.: WO97/25294

PCT Pub. Date: Jul. 17, 1997

(30) Foreign Application Priority Data

Jan. 10, 1996 (US) .................................................. 08584047

(51) Int. Cl.$^7$ ............................... H01M 4/88; H01M 4/96
(52) U.S. Cl. ...................... 429/42; 427/113; 427/126.1; 502/101; 204/290 R
(58) Field of Search ............................ 429/42; 427/113, 427/126.1, 419.7, 427; 204/290 R; 502/101; 252/389.4, 400.4

(56) References Cited

U.S. PATENT DOCUMENTS 3,881,039 * 4/1975 Baldieri et al. ...................... 427/294
5,753,382 * 5/1998 Sekhar et al. ...................... 429/42
5,985,114 * 11/1999 Sekhar et al. ...................... 204/290 R
6,001,236 * 12/1999 De Nora et al. .................. 427/113 X

FOREIGN PATENT DOCUMENTS

1107113  * 12/1955 (FR) .
93/25731 * 12/1993 (WO) .
94/28200 * 12/1994 (WO) .

OTHER PUBLICATIONS

Chemical Abstract vol. 112 No. 61523 A Vavilova et al., Feb. 1990.*

* cited by examiner

Primary Examiner—Stephen Kalafut
(74) Attorney, Agent, or Firm—Jayadeep R. Deshmukh (57) ABSTRACT

A carbon body, in particular a prebaked anode of an electrolytic cell for the production of aluminum by the electrolysis of alumina in a molten fluoride electrolyte, is treated over its surfaces to improve the resistance thereof to deterioration during operation of the cell by air and oxidizing gases released at the anode, by immersing the body in a treating liquid containing a soluble boron compound and at least one additive from the group consisting of aluminum compounds, calcium compounds, sodium compounds, magnesium compounds, silicon compounds, elemental carbon, and elemental aluminum, said additive being in the form of a powder, in suspension such as a colloid, or in solution, e.g., at 80° to 120° C. The same treatment can also be applied to a carbon mass forming a Söderberg anode and to cell sidewalls. The additives increase strength and improve oxidation resistance compared to impregnation with boric acid alone.

51 Claims, 2 Drawing Sheets

CARBON BODIES RESISTANT TO DETERIORATION BY OXIDIZING GASES

FIELD OF THE INVENTION

This invention relates in general to the treatment of carbon bodies which are exposed to high temperature oxidizing gases, in order to improve the resistance of the bodies to deterioration by these oxidizing gases.

The invention is concerned in particular with carbon bodies which are used as components of electrolytic cells for the production of aluminum, for example by the electrolysis of alumina in a molten fluoride electrolyte such as cryolite, wherein in use of the cell the carbon components are exposed to air and anodically-generated oxidizing gases.

One aspect of the invention is the method of treating such cell components or other carbon bodies to improve their resistance to deterioration by oxidizing gases at high temperatures. Further aspects of the invention concern the treated cell components and other carbon bodies, aluminum production cells including these components, an improved, preferably less odoriferous treating liquid, preferably with a reduced susceptibility to foaming, and use of this treating liquid to improve the oxidation resistance of carbon bodies.

BACKGROUND ART

Aluminum is produced conventionally by the Hall-Héroult process, by the electrolysis of alumina dissolved in cryolite-based molten electrolytes at temperatures up to around 950° C. In Hall-Héroult cells, the anodes are usually pre-baked carbon blocks that are consumed by the electrochemical reaction, corroded by contact with the electrolyte and disintegrated by the air and/or oxidizing gases present. Söderberg anodes made of a coherent carbon mass which solidifies in situ are also used.

Pre-baked anodes for aluminum production are made of a matrix of petroleum coke with pitch as binder. Their production involves various phases including preparing and treating the starting materials, mixing, forming and calcining at high temperature, followed by securing the current supply member by rodding.

The resistance of that part of the anode which remains outside the bath during cell operation is of paramount importance, not only to decrease the amount of anode consumption above the theoretical requirement but also to reduce the formation of carbon dust which is a cause of a reduction in current efficiency and an increase in cell temperature, and which must be eliminated when it collects on bath surface.

Of the several attempts to protect the anode, none has so far been satisfactory. The normal protection by aluminum spraying is costly and not always impervious. The oxidation of the carbon anodes, in the Hall-Héroult cell, outside the bath leads to a loss for the aluminum producer. Typically, instead of the theoretical consumption of 0.33 kg of carbon per ton of aluminium, often more than 0.43 kg is lost, the difference being caused mainly by air and $CO_2$ burn.

Many elements or compounds catalyze the oxidation reaction of carbons but the inhibition of the same reaction is more difficult to achieve. In general, the oxidation reactivity of carbon is reduced with absorbers, or with ceramic protection layers. Several absorber additives have been reported, such as metal, halogen compounds, and incorporated nitrogen. Ceramic protecting layers have been proposed, formed by low melting liquid glass, such as $B_2O_3$, $Cr_2O_3$, silica, etc.

The oxidation prevention treatment processes contemplated for the anode can be divided into two different groups, one is an additive added after the anode baking, the other is an additive added into the carbon paste. To date, only an aluminium coating protection treatment, or a thick layer of alumina and cryolite, has worked reasonably well for oxidation protection of commercial pre-baked anodes, but has several drawbacks, such as cost and difficulties in the cell operation. No oxidation protection has so far been suggested for Söderberg continuous anodes. Several other oxidation prevention treatments have worked well in the laboratory but have fallen short of the expected performance when the same treatments have been applied to the anodes tested in commercial cells. No apparent reason has been forthcoming and the discussion of such an effect has invariably been directed towards the possibility of the composition of the anode gases being the reason for such a difference.

When boron has been added to the anode paste in the form of elemental boron or boron compound, the oxidation rate of the carbon has been reduced but the contamination of aluminum is unacceptable.

Recently, U.S. Pat. No. 5,486,278 (Mangienello et al.) has disclosed a treatment process which has been shown to significantly reduce the oxidation of the anode in the laboratory as well in commercial cell tests in the pre-baked carbon anodes. This method comprises treating the anode or other component in a boron-containing liquid to intake the boron-containing liquid to a selected depth over parts of the surface to be protected, this selected depth being in the range 1–10 cm, preferably at least 1.5 cm and at most about 5 cm, preferably still at least about 2 cm and at most about 4 cm. This method was found to significantly reduce the oxidation of pre-baked anodes in laboratory tests and in commercial test cells. However, as discussed in detail below, it has been found unexpectedly that the greatly improved oxidation resistance obtained with this treatment is partly offset by a strength loss which could lead to burn-off after a critical weight loss when the anode is subjected to stress. This could lead to problems when the components are scaled up to industrial size.

Problems like those described above for pre-baked carbon anodes apply also to the carbon cell sidewalls including a lower part submerged in the electrolyte and an upper part which is exposed to $CO_2$-enriched air, and which disintegrate and wear away as a result of attack by oxidizing gases.

SUMMARY OF THE INVENTION

An object of the invention is to improve the resistance to oxidation of carbon bodies in particular carbon anodes or cell sidewalls of aluminum production cells by the incorporation of boron without the inherent drawbacks of the known proposals.

The invention is based on the insight that boron impregnated anodes and other carbon cell components made usually from petroleum coke and pitch suffer the drawback that the oxidation occurs particularly at the pitch location (bonding phase). With increasing time, the excess weight loss and disintegration of pitch (which is the bonding phase) reduces the overall mechanical strength so that after a certain time and above a certain temperature, when the weight loss reaches a critical amount (which may typically be about 8–10 wt %) the material reaches it brittleness limit and starts to collapse. In large components, this brittleness limit may be encountered in the cell before the main part of the anode has been consumed, and could lead to massive failure.

The invention provides a composition for the boron-containing impregnating liquid that minimizes attack in the pitch phase and hence improves the strength of the carbon while improving the oxidation resistance or at least maintaining it at the same level. The invention therefore aims to reduce the anode consumption by reducing anode brittleness and further improving the oxidation resistance. Similar advantages can be obtained with cell sidewalls or other carbon bodies such as Söderberg anodes, subjected to attack by oxidizing gases at high temperatures. A further improvement may be provided by making the impregnating liquid less odoriferous and/or less susceptible to foaming.

THE METHOD OF THE INVENTION

The invention provides a method of treating a carbon body, in particular a carbon-based anode or sidewall of an electrolytic cell for the production of aluminum in particular by the electrolysis of alumina in a molten fluoride electrolyte such as cryolite, to improve the resistance thereof to deterioration by the attack of oxidizing gases, using boron in acceptable amounts in the surface parts exposed in use to oxidizing gases, in combination with selected agents and additives.

According to the invention, the boron-containing liquid contains at least one additive from the group consisting of aluminum compounds, calcium compounds, sodium compounds, magnesium compounds, silicon compounds, elemental carbon and elemental aluminum, said additive being in the form of a powder, in suspension, as a colloid, or in solution. The aluminum compounds and calcium compounds may be aluminum acetate boric, colloidal alumina, calcium acetate, calcium carbonate, calcium oxide and calcium aluminate. The silicon compound may be colloidal silica, which could advantageously react with the boron compound to form a boro-silicate glassy coating. Preferably a surfactant may be used as part of the treating liquid, in which case, advantageously, an anti-foaming agent is also included.

The anode impregnation treatment according to the invention provides a protected layer of one or more centimeters, in which the addition of the stated additive/s serves to minimize attack to the pitch binder phase and therefore improves the strength of the carbon when it is subjected to wear during use in the cell. The impregnation treatment also improves the oxidation resistance of the anode compared to impregnation with the boron compound alone, or at least maintains it at the same level.

The addition of aluminum compounds such as aluminum acetate boric and colloidal alumina decreases the oxidation rate and increases strength. The addition of calcium compounds acts as a strength reinforcing agent and also produces an improvement in oxidation rate.

Preferably, the treating liquid contains at least one aluminium compound and at least one calcium compound, which together form calcium aluminate which acts as a cement to reinforce the carbon body.

The treatment method applies particularly to pre-baked carbon anodes, which are subject to mechanical stress during operation. With the treatment, damage to the outer surface is not detrimental to the protection against oxidation, due to the thickness of the treatment which provides a long-lasting protective effect as the inside part of the anode wears away slowly during use, with greatly improved mechanical resistance of the carbon.

The treatment method can also be applied to the outer part of Söderberg anodes as they move down in the conventional manner.

The treatment method is also applicable to a cell sidewall, particularly the upper part of the cell sidewall that is exposed to air and the effect of oxidizing gases during use, as well as the lower part which is exposed to carbo-oxidation reactions with $CO_2$ at the surface or to the part of the sidewall submerged in the electrolyte.

In the case of carbon bodies, in particular cell sidewalls, the protective effect can be enhanced by topcoating the exposed part of the impregnated sidewalls with a layer of refractory material, e.g. particulate diboride in a colloidal carrier, such as titanium diboride in colloidal alumina or colloidal silica, as described in WO 93/25731.

The following details of the treatment process are given with reference to the particular components and method used, but also apply in general to any carbon component subjected to attack by oxidizing gases.

The treating liquid comprises a boron compound such as $B_2O_3$, boric acid or tetraboric acid dissolved in a solvent, further including at least one additive as described above, and preferably containing at least one surface-active agent. Good results have been achieved with boric acid and precursors of boric acid that form $B_2O_3$. Borates have not been found to give as good results.

The treating liquid preferably contains 5–60 weight % of the boron compound or mixture of a plurality of boron compounds, preferably in an aqueous solvent as a temperature in the range from 10° to 200° C., preferably 20° C. to 120° C. and more preferably 60° C. to 90° C., these conditions ensuring excellent penetration of the treating liquid into the porous carbon. The additive is preferably added in a weight quantity up to two times the weight quantity of boron compound (or mixture of boron compounds), more preferably in a weight quantity not exceeding the amount of boron compound (or mixture of boron compounds), even more preferably the weight quantity of additive does not exceed about ⅓, most preferably no more than about ⅕, of the boron compound (or mixture of boron compounds). For treating liquids with 50–60 weight % of boron compounds, solvents like methanol, ethylene glycol or glycerin are used at a temperature of about 80° C. or above.

It is advantageous to carry out the treatment with a heated liquid in order to increase the solubility of the boron compound and decrease the treatment time, if necessary with preheating of the anode. When using an aqueous solvent based treating liquid, the liquid may advantageously be steamed on to the substrate without heating the substrate. Carrying the treatment out at ambient temperature is possible and also convenient because no special heating equipment is required. The temperature of the carbon body in preferably from 20° C. to 200° C.

At low temperatures, certain solvents such as methanol, ethylene glycol and glycerin will be preferred, possibly with additives to enhance the solubility of the boron compound, and the treatment time may be extended. When water is used as the solvent, surfactant agents, in particular tensio-active cationic agents devoid of components that would undesirably contaminate the aluminium produced and devoid of components that promote oxidation of the carbon, may be used. Anionic tensio-active agents can also be used. These surface-active agents may possibly be present together with other solubility improving agents such as tartaric acid or citric acid. The liquid may of course also be heated to improve and speed up the impregnation of the anode.

The use of surface active agents is an important factor to accelerate penetration of the liquid and to obtain impregnation to a sufficient depth of several centimeters in only a few minutes, since long treatment times could make the process impractical and uneconomical. The coefficient of diffusion of the liquid into the porous carbon structure and the wettability of the carbon by the liquid will influence the rate and the degree of penetration. Liquids with low surface tension providing an angle of contact with the carbon of less than 90° provide adequate wettability and facilitate penetration. A suitable high temperature will also enhance diffusion of the liquid.

When water is chosen as solvent, a surfactant such as those available under the trade names NONIDET P 40 and SPAN 85, from Fluka, and GLUCOPON 225, DEHYPON LS, QUAFIN LDM and QUAFIN CT, from Henkel, can be used in order to achieve an acceptable low treatment time. Preferably, the surfactant is used at a level ranging from 0.05 to 0.25 weight percent of the total treating liquid.

It has been observed that the use of a surfactant can cause foaming of the treating liquid, if the liquid is stirred for dispersion of the ingredients. If the surfactant is added after the addition of, and separate from, the other components, depending on the particular surfactant used, an unpleasant odor may also be encountered. No odor is encountered without foaming, although an odor is not always encountered when foaming is. For example, if the surfactant is added with the rest of the ingredients, foaming is observed, but no odor is observed. When the surfactant QUAFIN CT is used, foaming is observed as described above. If, however, an anti-foaming agent such as Dow Corning Antifoam 2210 is added separate from all other ingredients and immediately prior to addition of the surfactant, no foaming is observed. If the anti-foaming agent is added immediately after the surfactant, again no foaming or odor is observed.

A boron compound or mixtures of boron compounds is added to the solvent in a quantity sufficient to guarantee saturation or near saturation of the liquid upon heating, even leaving a deposit of the undissolved compound in the bottom of the vessel. The additive/s is/are also added in amounts compatible with their solubilities, generally in a quantity which does not exceed $\frac{1}{3}$ (usually no more than about $\frac{1}{5}$th) the amount of the boron compound/s.

A carbon body, in particular an anode or a side-wall to be treated is then immersed in the treating liquid. Immersion is continued for a set time, e.g. from 2–60 minutes, or until a desired intake of the solution into the treated surfaces.

Usually, a single impregnation suffices, but the impregnation and drying may be repeated, if necessary, until the treated anode surface is saturated with the treating liquid.

The vapors produced in the described conditions are not toxic and can be freely released into the air without a need for costly treatment installations.

The treatment time depends principally on the exposed surface area of the anode or other component and its porosity, as well as temperature. It has been observed that prolonging the treatment does not significantly increase boron concentration.

Anodes or other components are conveniently impregnated simply by dipping them into the treating liquid, which can take place in ambient conditions, but the impregnation may be assisted by the application of a pressure differential, by applying pressure or a vacuum. Other ways of speeding up impregnation can also be used, such as the application of ultrasounds. Alternative application methods include steaming, painting, dabbing, vacuum impregnation, coating and the like.

In the manner described above, the treating liquid impregnates the carbon anode/substrate to a depth of 0.5–10 cm, for example approximately 2 to 4 or 5 cm, with a concentration of boron in the impregnated surface of the carbon anode/substrate in the range from 100 ppm to 0.35%, or possibly even higher. Even with the highest achievable levels of boron concentration, the problem of process contamination is avoided because the protective boron compounds are present only in the surfaces needing protection, and only to a depth of a few centimeters or less. For a pre-baked anode, only the top surface and the top part of the side surfaces (shoulders) need to be impregnated.

By impregnating the parts of the anode to be protected—namely the side and top surfaces—with a small quantity of the boron treating liquid to a depth of 0.5 or several centimeters, and by the action of the aluminum and/or calcium compounds as additives to maintain the strength and improve the oxidation resistance, a long-lasting protective effect is achieved because the surfaces exposed to oxygen wear away very slowly over a long period, enhancing the strength while avoiding undesirable contamination of the aluminum produced.

The anode is usually made of petroleum coke and pitch, the anode having an open porosity of at least 5%, usually in the range 5 to 30%, preferably from 5 to 20%. The treatment can also be applied to porous carbon-based materials. For example, the anode may also be made of a composite carbon-based material comprising at least one further component such as refractory oxycompounds, in particular alumina. Examples of such materials are described in WO 93/25494. The composite material preferably comprises predominantly petroleum coke and pitch.

The impregnation treatment of a pre-baked anode according to the invention is made after calcining which provides the anode surface with the highest porosity, thereby improving the penetration of the liquid to a depth of 0.5 or several centimeters.

Oxidation of the anodes increases with porosity. Thus, with the impregnation treatment, the most porous part of the anode which is most prone to damage by oxidation, is protected. In other words, more porous parts of the surface to be protected are penetrated more and deeper by the composite boron-containing liquid, providing greater protection where needed.

The intake of the treating liquid into the anode/substrate can be monitored by checking the level of the treating liquid, or simply by the time of immersion for a given treating liquid and an anode/substrate of given porosity.

The top surfaces and at least the upper parts of the shoulders of a pre-baked anode can be immersed in the composite boron-containing liquid by dipping the anode upside down in the liquid. There is no need to treat the bottom of the anode where the electrochemical reaction takes place. In this way, only those parts of the anode which need protection are treated, and the amount of boron in the anode (and hence in the aluminum produced) is minimized.

When it is desired to treat rodded anodes, i.e. when the anode's current lead-in rod has already been connected to the top surface, it is more convenient to immerse the anodes with the rodded top side up. In this case, the lower surface of the anode which does not need protection against oxidation can for example either be temporarily blocked by a product or be temporarily isolated by a suitable device which prevents impregnation of the treating liquid and which product/device can be removed afterwards or which volatilizes.

As an alternative, the carbon substrates can be treated by spraying the treating liquid as steam under high pressure. In the case of Söderberg anodes, the treating liquid can be sprayed as steam onto the outer surface of the mass.

Test Results

Tests have been conducted with carbon samples impregnated according to the invention, with non-impregnated carbon samples and with carbon samples impregnated with a boron-containing liquid alone, i.e. without the additives according to the present invention ("boron only samples").

The non-impregnated samples showed severe weight loss when subjected to oxidizing conditions above 500° C. The boron-only samples showed a greatly increased resistance to oxidation, i.e. a much lower weight loss when subjected to the same oxidizing conditions. However, surprisingly, the boron-only samples were found to suffer a strength loss such that when the weight loss reaches a critical amount (found in the test typically to be about 10%), the sample reaches its brittleness limit and is liable to collapse when subjected to stress.

Carbon samples impregnated according to the invention showed improved strength compared to the "boron only" samples under the same oxidizing conditions, with an equivalent or improved oxidation resistance.

The mechanism involved was investigated based on the fact that the carbon consists at least of two major phases, namely the petroleum coke particles and the pitch binder. The petroleum coke carbon and coked pitch carbon (calcined) were treated separately with the boron-only liquid to examine the influence of the treatment on the individual components when subjected to oxidation tests. Visual results indicated that a glassy layer was formed on the surface of the petroleum coke carbon. The petroleum carbon coke particles were not disintegrated after oxidation. However, disintegration was observed for the coked pitch carbon under similar conditions.

The results indicate that the oxidation rate of the pitch carbon is higher than that of the petroleum coke carbon. This high oxidation rate is on account of the amorphous phase and large surface area of the pitch carbon. The oxidation rate difference between two types of carbon is enhanced when the pre-baked carbon anodes are treated with an oxidation prevention treatment. The preferential oxidation of pitch carbon makes the bonding phase (binder) fail early and can lead to damage because of a loss in strength. The strength loss by the preferential oxidation is indicated by a diametral tensile strength test. When a boron-only treatment is used, the preferential oxidation is enhanced and may lead to fracture of an anode even before significant oxidation. However, when a treatment with the additives according to the present invention is used, the preferential oxidation is suppressed and strength loss is limited.

For pre-baked anodes used in full-scale cells, it has been found that a brittleness limit may be encountered prior to oxidation damage. This brittleness limit is encountered in anodes which are impregnated with oxidation prevention liquids which increase the oxidation rate difference between the several phases present in the anode. Therefore several treatments which worked well in the laboratory are subject to failure when applied to commercial anodes. The treatment according to the present invention has been shown to significantly reduce the oxidation of the anode in laboratory tests as well as in commercial cell tests. Additionally, this treatment suppresses the onset of the brittleness problem. The invention thus provides an anode treatment process which can be successfully applied to commercial anodes.

The carbon consumption due to air-oxidation of anodes treated according to the present invention corresponds to about 10–15% of the maximum consumption, which is comparable to what can be achieved with traditional aluminum protective coatings. Thus, the present invention provides an excellent and long-lasting protective effect at much less cost and with less risk of imperfections in the protection than with traditional aluminium protective coatings, and with better strength and oxidation resistance compared to impregnation with boron only treating liquids.

The components of the treating liquid are inexpensive and are non-polluting both for the aluminum production process and for the environment. The methods of the present invention are simple to carry out, and the treated surfaces are uniformly impregnated with the boron compounds, leading to reliability in use because of uniform wear to the exposed surfaces of the anode or sidewall. Also, as boron acts as a "negative catalyst," it is possible to make the anode and sidewall from carbon containing a higher content of vanadium, thereby reducing the cost of raw materials. Incorporation of the additives according to the present invention minimizes strength loss so that large scale anodes or sidewalls or other components can be made with improved oxidation resistance.

Further Aspects of the Invention

In addition to the above-described methods, the invention also concerns a carbon body which has a part of its surface exposed during use to high temperature oxidizing gases, said surface part being treated, to improve the resistance thereof to deterioration by said oxidizing gases, by impregnation with a boron-containing treating liquid which further contains at least one additive from the group consisting of aluminum compounds, calcium compounds, sodium compounds, magnesium compounds, silicon compounds, elemental carbon, elemental aluminium, said additive being in the form of powder, in suspension, as a colloid, or in solution.

Such a body may be a cell component of an aluminum production cell treated by the method set out above.

The impregnation treatment can also be applied to a carbon mass forming a self-feeding Söderberg anode, preferably by treating only the part of the mass subjected to oxidation by air and anodically-evolved oxidizing gases. The invention also concerns an electrolytic cell for the production of aluminium, in particular by the electrolysis of alumina in a molten fluoride electrolyte such as cryolite, comprising a pre-baked or Söderberg anode, or a sidewall or other component, as set out above, the anode or sidewall or other component being installed with the treated surfaces in contact with air and oxidizing gases released during operation of the cell.

The invention also concerns the treating liquid itself which, in a preferred formulation, contains, per 100 ml of water (including a small quantity of a surface-active agent), 2–10 grams of boron (as metal in the form of a boron compound) and as additives, aluminum acetate boric together with at least one of calcium acetate and calcium carbonate in a total amount of additives not exceeding the amount of boron. Another preferred formulation of the treating liquid contains, per 100 ml of water (including a small quantity of a surface-active agent), 2–6 grams of boron (in the form of a boron compound) and, as additives, aluminum and/or calcium compounds in a weight quantity of up to two time the weight quantity of the boron. Yet another preferred formulation of the treating liquid contains, per 100 ml of water (including a small quantity of a surface-active agent), 20–30 grams of boron (in the form of a boron compound) and, as additives, at least one compound selected from the group consisting of aluminum compound and calcium compounds in a total weight quantity not exceeding two time the weight quantity of the boron.

Another aspect of the invention is use of the treating liquid to improve the resistance of a carbon body to deterioration by the attack of oxidizing gases at high temperatures.

A further inventive feature is that at the end of the service life of the boron-impregnated anodes, the remaining anode butt can be treated by thermal means or by means of water or another solvent or solvents, or by spray washing, to remove the remaining boron compounds, before recycling the remaining carbon to be mixed with fresh carbon for the manufacture of new anodes. By processing the used anode butts in this way, the residual boron is removed from the carbon, so that the new anodes including the recycled carbon do not unwantedly contain boron throughout their mass which would increase the boron level in the product aluminium.

BRIEF DESCRIPTION OF DRAWINGS

The invention will be further described by the way of example, and compared to the prior art, with reference to the accompanying drawings wherein.

SAMPLE PREPARATION

Carbon anode samples were cut from pieces of commercial pre-baked anodes of a Hall-Héroult cell. The samples were fully dried at 100–250° C. for a drying time depending on their size. For example, for samples consisting of a 3 cm long cylinder of 5 cm diameter, a 4 hour drying time is adequate. The samples ranged in weight from 50–70 g, had a diameter of 5 cm and a length from about 2 to about 3 cm.

A typical treating liquid was prepared in the following proportions: 25 g of boric acid with the addition of 2 g aluminum acetate boric, 2 g calcium acetate and 0.5 g calcium carbonate in 100 ml of aqueous solvent.

Alternative additives were selected from acetate boric+calcium carbonate; colloidal alumina alone; acetate boric alone; colloidal alumina+calcium acetate; colloidal alumina+calcium oxide; acetate boric+calcium oxide; colloidal silica alone; powdered metal alone and mixtures thereof. The total additive was kept about at 4.5 g, i.e. just below ⅕th the amount of boric acid.

The liquid was heated to 85° C. and mixed until all of the additives were dissolved. Then 0.1 wt % of a surfactant agent (for example, QUAFIN-CT available from Henkel), was added and mixed for 1 minute. Addition of this surfactant may cause foaming and odor. Both can be avoided by adding an anti-foaming agent before or after the addition of the surfactant. The odor can be avoided without addition of the anti-foaming agent if the surfactant is added prior to the heating. Preferably, the anti-foaming agent is added in an amount about equal to that of the surfactant.

The anode sample is then immersed in the liquid at 85° C. For this purpose, the overall volume of the treating liquid must preferably be five times greater than the anode sample and the sample must preferably be able to be totally immersed in the liquid. Upon immersion, bubbling is observed. The immersion time is dependent on the sample size. A 5 to 10 minute immersion time is recommended for a 3 cm long cylinder of 5 cm diameter. Alternatively, the treating liquid may be steamed onto the anode sample using a commercially available steam "cleaner".

The sample is then removed from the liquid and placed in a furnace at 180–200° C. for a drying time dependent on the sample size. A 4 hour drying time was sufficient for a 3 cm long cylinder of diameter 5 cm.

Several samples were prepared as above, varying the liquid composition and the impregnation time and/or method. Samples where the additive was omitted are referred to as "boron-only". The treated samples and several untreated commercial carbon anode blocks of similar sample size were then subjected to the following test procedures.

Oxidation Test Procedure

An oxidation resistance test was performed in a static oxidation condition. The sample surface area and weight were measured before the sample was placed in the furnace and the weight change was measured after certain holding times. The static oxidation test was conducted at a controlled temperature of 500° C., 600° C. or 800° C.±5%; the duration of the exposure varied from 6–150 hours.

Mechanical Strength Test Procedure

The tensile strength of the samples was determined using a method called the diametral compression test. The test is based on the state of stress (F) developed when a cylindrical sample is compressed between two diametral opposite forces, to determine the maximum diametral tensile stress ($S_T$), which acts on the loaded diameter during the test up to failure. At failure, the diametral tensile strength can be calculated according to $S_T=2F/\pi hD$. The diameter to height ratio D/h typically ranges between 1.5 and 2.

An Instron-4206 machine was used to measure the diametral maximum stress of the treated and untreated samples. The cross head loading speed was kept at 0.1 mm/min. constant rate.

The diametral compression test was carried out on the samples after a given measured weight loss recorded in the oxidation test procedure.

Results

Untreated anodes showed severe weight loss after 20 hours at temperatures higher than 500° C. The weight loss is influenced by temperature and time. After passage of certain time period, the oxidation rate increases sharply. Oxidation occurs on the petroleum coke and pitch (bonding phase) and the sharp increase in oxidation rate is due to the loss of the bonding phase which increases the weight loss. For the untreated samples, the weight loss was so great it could not be effectively measured.

At 500° C., the boron-only impregnated samples show a negligible weight loss in a short term oxidation test (6 or 12 hours). However, in a long term oxidation test (500° C. for 150 hours or 600° C. for 15 hours, the samples showed a significant strength loss associated with the weight loss. These boron-only impregnated samples thus showed a much lower weight loss, than untreated samples but the lower weight loss was associated with a higher strength loss as a function of the weight loss.

From this data it is deduced that with the boron-only impregnated samples, oxidation occurs mostly at the pitch location (bonding phase), which, with time, reduces the overall mechanical strength. After a certain time and temperature, when the weight loss reaches a critical amount (about 8–10% weight loss), corresponding to the brittleness limit, the sample starts to disintegrate.

Figure 1:
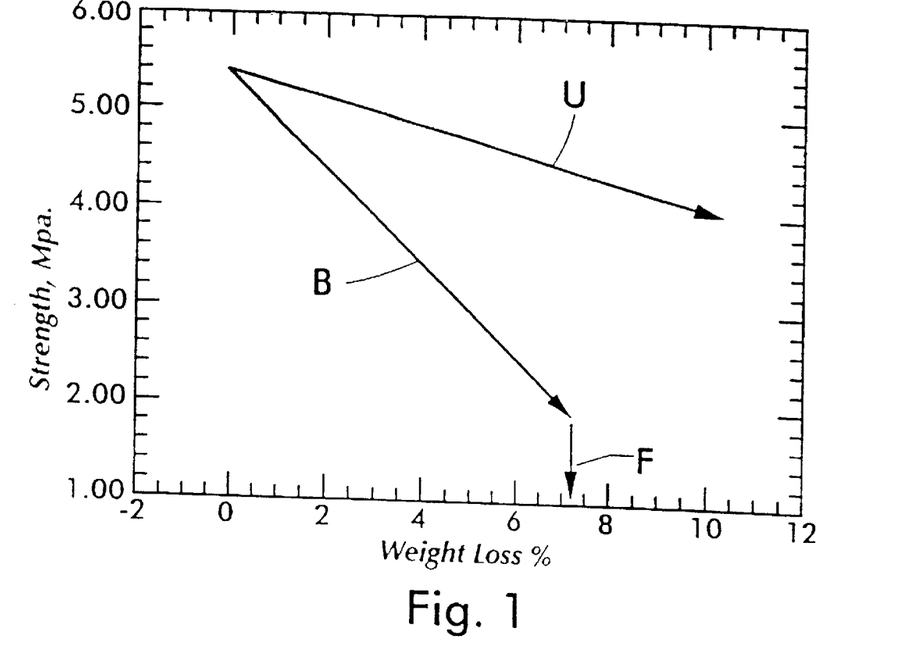
FIG. 1 is a graph of strength vs. weight loss for untreated samples and comparative samples impregnated with boron only.

The strength of the untreated and boron-only treated samples is plotted in FIG. 1 as a function of the percentage weight loss. It can be seen from this graph that the boron-only treated samples B progressively lose strength with increasing weight loss compared to the untreated samples U, it being understood that the boron-only treated samples are nevertheless advantageous due to the fact that they exhibit much improved oxidation resistance. At a given weight loss, about 8 wt % in this example, the boron-only treated samples reach the brittleness limit and are subject to failure, as indicated by F. Commercial pre-baked anodes must be in service for about 30 days, during which service period the observed strength loss becomes a factor for the loss of anode material.

Figure 2:
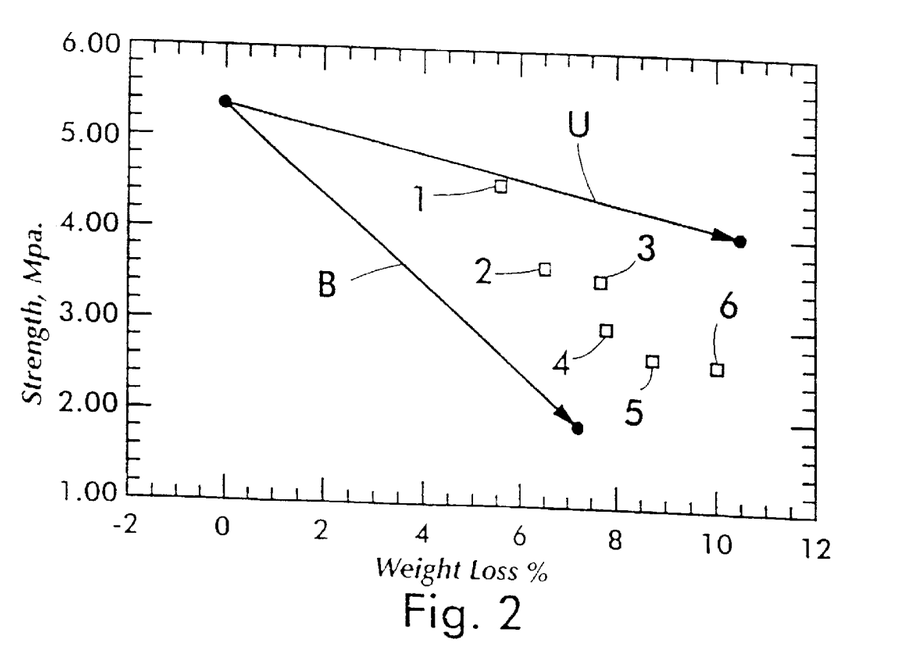
FIG. 2 is a similar graph on which are also plotted the results for samples impregnated with boron and alumina and/or calcium compounds according to the invention.

FIG. 2 is a similar graph to which have been added results with samples impregnated with alumina and/or calcium compounds according to the invention. All of these samples showed improved oxidation resistance compared to the boron-only impregnated samples, as well as improved strength as discussed above. The improved strength over the anode lifetime coupled with the improved oxidation resistance procured by the invention significantly improve the performance of anodes impregnated according to the invention over their service life.

The individual components of the additives for the plotted points were as follows:

1. aluminum acetate boric+calcium carbonate
2. colloidal alumina
3. aluminum acetate boric
4. colloidal alumina+calcium acetate
5. colloidal alumina+calcium oxide
6. aluminum acetate boric+calcium oxide The steam application method described above, results in greatly improved oxidation weight loss for anodes at 600° C., as compared to untreated anodes and anodes treated by the dipping method (using the same treating liquid used for steaming), as shown below in Table 1:

TABLE 1

Oxidation Rate of the Steam and Dip Treated Anodes at 600° C.

| Commercial Anode | | Dipped | | Steamed | |
|---|---|---|---|---|---|
| Time (hrs) | Weight Loss (g/cm$^2$) | Time (hrs) | Weight Loss (g/cm$^2$) | Time (hrs) | Weight loss (g/cm$^2$) |
| 2 | 0.1162 | 2 | 0.0222 | 2 | 0.0111 |
| 2 | 0.2272 | 4 | 0.0498 | | |
| 9 | 0.3559 | 6 | 0.0814 | 6.5 | 0.0458 |
| 12 | 0.6260 | 12 | 0.1831 | 12 | 0.1009 |

Figure 3:
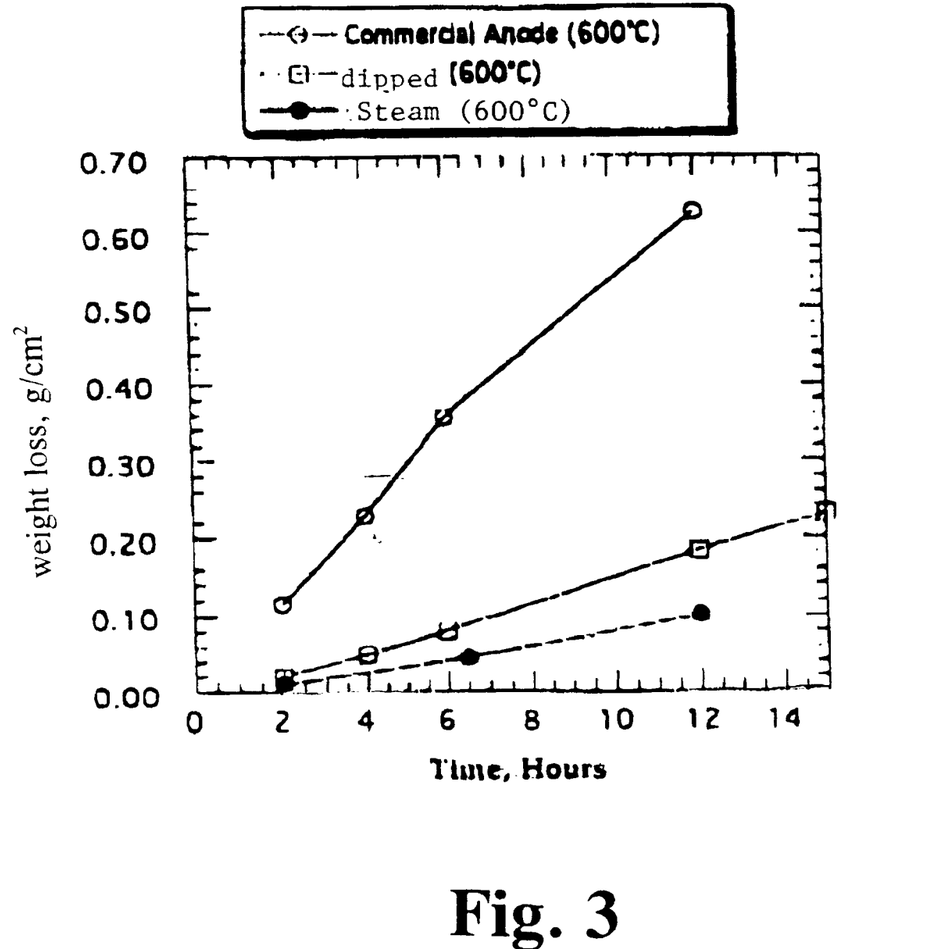
FIG. 3 is a comparative graph showing oxidation rates of steam treated, dip-treated and untreated anodes at 600° C.

The results from Table 1 may be seen in the form of a graph in FIG. 3. Aside from the improved oxidation resistance, the steam method may be used for treating components which are already installed in an aluminum production cell (as opposed to new components for which dipping is possible). Additionally, preheating of the component (drying), of the substrates, which is usual for the dipping method, is not necessary for the steam method.

What is claimed is:

1. A method of treating a carbon body which is subject to oxidizing gases, to improve the resistance of the body to deterioration by said oxidizing gases and to reduce strength loss exhibited by a carbon body treated only with boron, which comprises impregnating said body to a depth of 0.5 to 10 cm with a treating agent containing at least one soluble boron compound in a solvent that contains at least one additive selected from the group consisting of aluminum compounds, calcium compounds, sodium compounds, magnesium compounds, silicon compounds, elemental carbon, and elemental aluminum, said additive being present in an amount effective to reduce the strength loss exhibited by a carbon body treated only with boron, and said additive being in the form of a powder, in suspension, as a colloid, or in solution.

2. The method of claim 1, wherein the solvent contains at least one aluminum compound selected from aluminum acetate boric and colloidal alumina.

3. The method of claim 1, wherein the solvent contains at least one calcium compound selected from calcium acetate, calcium carbonate, calcium oxide and calcium aluminate.

4. The method of claim 1, wherein the solvent contains at least one aluminum compound and at least one calcium compound which together form calcium aluminate.

5. The method of claim 1, wherein the silicon compound is colloidal silica.

6. The method of claim 5, wherein the colloidal silica forms borosilicate glass with the boron compound.

7. The method of claim 1, wherein the solvent contains elemental aluminum.

8. The method of claim 1, wherein the solvent contains 2–10 grams of boron from said boron compound per 100 ml of solvent, the quantity of the additive compound being up to two times the quantity of boron.

9. The method of claim 1, wherein the solvent is selected from methanol, ethylene glycol, glycerin, water and mixtures thereof.

10. The method of claim 9, wherein the solvent further comprises at least one surface-active agent.

11. The method of claim 10, wherein the solvent further comprises an anti-foaming agent.

12. The method of claim 11, wherein said anti-foaming agent is added prior to the addition of the surface active agent.

13. The method of claim 1, wherein the solvent contains $B_2O_3$, boric acid or tetraboric acid.

14. The method of claim 1, comprising impregnating the carbon body to a depth of approximately 2 to 5 cm.

15. The method of claim 14, wherein the weight concentration of boron in the impregnated portion of the carbon body is in the range from 100 ppm to 0.35%.

16. The method of claim 1, wherein the carbon body is impregnated by immersion in the solvent containing the treating agent and the additive with or without the application of a pressure differential.

17. The method of claim 1, wherein the treatment is carried out by immersion of the carbon body at a temperature of 20° C. to 200° C. in the solvent containing the treating agent and the additive at a temperature in the range of 10° C. to 200° C.

18. The method of claim 1, wherein the temperature of the solvent containing the treating agent and the additive ranges from 20° C. to 120° C.

19. The method of claim 18, wherein the carbon body is immersed in the solvent containing the treating agent and the additive for about 2 minutes to 1 hour.

20. The method of claim 1, wherein impregnation of the solvent containing the treating agent and the additive in the carbon body is assisted by the application of a pressure differential.

21. The method of claim 1, wherein the solvent containing the treating agent and the additive is aqueous and is applied to the surface of the carbon body to be treated by spraying as steam under pressure.

22. The method of claim 1, wherein the carbon body is made of petroleum coke and pitch, or is a composite material comprising predominantly petroleum coke and pitch, the carbon body having an open porosity of at least 5%.

23. The method of claim 1, wherein said carbon body is a component of an electrolytic cell for the production of aluminum, which component is exposed to air and anodically-released oxidizing gases present in the cell.

24. The method of claim 23, wherein said cell component is a pre-baked carbon anode.

25. The method of claim 24, wherein top and shoulders of the anode are treated with the solvent containing the treating agent and the additive.

26. The method of claim 23, wherein said cell component is a carbon mass forming a Söderberg anode.

27. The method of claim 23, wherein said cell component is a cell sidewall.

28. The method of claim 27, which comprises applying a coating of refractory boride on top of the surface of the sidewall previously treated with the solvent containing the treating agent and the additive.

29. The method of claim 28, wherein said refractory boride is particulate titanium diboride in colloidal alumina.

30. The method of claim 28, wherein said refractory boride is particulate titanium diboride in colloidal silica.

31. A carbon body which has a part of its surface exposed during use to oxidizing gases, said surface part being impregnated to a depth of 0.5 to 10 cm, to improve the resistance of the body to deterioration by said oxidizing gases and to reduce strength loss exhibited by carbon body treated only with boron, with a treating agent containing at least one soluble boron compound in a solvent that contains at least one additive from the group consisting of aluminum compounds, calcium compounds, sodium compounds, magnesium compounds, silicon compounds, elemental carbon, elemental aluminum, said additive being present in an amount effective to reduce the strength loss exhibited by a carbon body treated only with boron, and said additive being in the form of a powder, in suspension, as a colloid, or in solution.

32. The carbon body of claim 31, wherein the solvent contains at least one aluminum compound selected from aluminum acetate boric and colloidal alumina.

33. The carbon body of claim 31, wherein the solvent contains at least one calcium compound selected from calcium acetate, calcium carbonate, calcium oxide and calcium aluminate.

34. The carbon body of claim 31, wherein the silicon compound is colloidal silica.

35. The carbon body of claim 34, wherein the colloidal silica forms borosilicate glass with the boron compound.

36. The method of claim 31, wherein the solvent contains elemental aluminum.

37. The carbon body of claim 31, which is a component of an electrolytic cell for the production of aluminum which component is exposed to air and anodically released oxidizing gases present in the cell.

38. The carbon body of claim 37, which is a pre-baked carbon anode, having top and shoulders treated with the said compounds.

39. The carbon body of claim 37, which is a mass forming a Söderberg anode.

40. The carbon body of claim 37, which is a cell sidewall.

41. The carbon body of claim 40, which comprises a coating of refractory boride on top at least a part of the treated surface of the sidewall.

42. The carbon body of claim 31, wherein the surface is impregnated with the boron compound to a depth of approximately 2 to 5 cm.

43. The carbon body of claim 31, wherein the weight concentration of boron in the impregnated portion of the carbon body is in the range from 100 ppm to 0.35%.

44. The carbon body of claim 31, which is made of petroleum coke and pitch, or is a composite material predominantly comprising petroleum coke and pitch, the body having an open porosity of at least 5%.

45. An electrolytic cell for the production of aluminum by the electrolysis of alumina in a molten fluoride electrolyte, comprising a carbon body according to claim 31, the carbon body being installed with its treated surface in contact with oxidizing gases present in the cell.

46. The cell of claim 44, wherein the carbon body is a pre-baked carbon anode.

47. The cell of claim 44, wherein the carbon body is a carbon mass forming a Söderberg anode.

48. The cell of claim 44, wherein the carbon body is a sidewall.

49. The cell of claim 48, wherein at least a part of the treated surface of the sidewall is coated with a coating of a refractory boride.

50. The cell of claim 49, wherein the refractory boride is titanium diboride in colloidal alumina.

51. The cell of claim 49, wherein said refractory boride is particulate titanium diboride in colloidal silica.

* * * * *

UNITED STATES PATENT AND TRADEMARK OFFICE
CERTIFICATE OF CORRECTION

PATENT NO. : 6,194,096 B1
DATED : February 27, 2001
INVENTOR(S) : Jainagesh A. Sekhar; Vittorio de Nora and Jean-Jacques Duruz It is certified that error appears in the above-identified patent and that said Letters Patent is hereby corrected as shown below:

Column 12,
Line 10, delete "is" and substitute therefor -- in --.

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,194,096 B1         Page 1 of 1
DATED     : February 27, 2001
INVENTOR(S) : Jainagesh A. Sekhar; Vittorio de Nora and Jean-Jacques Duruz It is certified that error appears in the above-identified patent and that said Letters Patent is hereby corrected as shown below:

<u>Column 4,</u>
Line 51, delete "in" and substitute therefor -- is --;

<u>Column 14, claim 41,</u>
Line 21, insert -- of -- between "top" and "at".

Signed and Sealed this

Eighteenth Day of December, 2001

Attest:

JAMES E. ROGAN
*Attesting Officer*  *Director of the United States Patent and Trademark Office*